United States Patent
Liu et al.

(10) Patent No.: US 10,956,074 B2
(45) Date of Patent: Mar. 23, 2021

(54) DATA STORAGE METHOD, MEMORY STORAGE DEVICE AND MEMORY CONTROL CIRCUIT UNIT

(71) Applicant: PHISON ELECTRONICS CORP., Miaoli (TW)

(72) Inventors: Shao-Hsien Liu, Miaoli County (TW); Chien-Han Kuo, Tainan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 29 days.

(21) Appl. No.: 15/798,370

(22) Filed: Oct. 30, 2017

(65) Prior Publication Data

US 2019/0065097 A1    Feb. 28, 2019

(30) Foreign Application Priority Data

Aug. 30, 2017   (TW) .................... 10612949.0

(51) Int. Cl.
  *G06F 3/00*   (2006.01)
  *G06F 3/06*   (2006.01)

(52) U.S. Cl.
  CPC .......... *G06F 3/0647* (2013.01); *G06F 3/0611* (2013.01); *G06F 3/0656* (2013.01); *G06F 3/0659* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 2003/0028626 A1* | 2/2003 | Hennessey | H04L 41/5058 709/220 |
| 2012/0151124 A1* | 6/2012 | Baek | G06F 12/0246 711/103 |
| 2014/0208046 A1* | 7/2014 | Baryudin | G06F 3/0605 711/159 |

FOREIGN PATENT DOCUMENTS

| | | |
|---|---|---|
| TW | I479313 | 4/2015 |
| TW | 201727647 | 8/2017 |

* cited by examiner

*Primary Examiner* — David Yi
*Assistant Examiner* — Craig S Goldschmidt
(74) *Attorney, Agent, or Firm* — JCIPRNET

(57) ABSTRACT

A data storage method is provided according to an exemplary embodiment of the disclosure. The method is configured for a rewritable non-volatile memory module. The method includes: performing a data merge operation; adjusting a data receiving amount per unit time for receiving to-be-written data from a host system according to a data storage state of the rewritable non-volatile memory module; storing the received to-be-written data into a buffer memory during the data merge operation being performed; and storing the data stored in the buffer memory into the rewritable non-volatile memory module.

33 Claims, 9 Drawing Sheets

DATA STORAGE METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 106129490, filed on Aug. 30, 2017. The entirety of the above-mentioned patent application is hereby incorporated by reference herein and made a part of this specification.

BACKGROUND

Technology Field

The disclosure relates to a memory management technology. More particularly, the disclosure relates a data storage method, a memory storage device, and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, compact size, and no mechanical structure make the rewritable non-volatile memory module (e.g., flash memory) ideal for being built in the portable multi-media devices as cited above.

Generally, a predetermined number of spare physical blocks are disposed in a memory device. When data is intended to be stored, one of the spare physical blocks is used for storing the data. Nevertheless, as increasing amount of data is stored into the memory device, more and more spare physical blocks are used, and thus the number of the spare physical blocks gradually reduces. When the number of the spare physical blocks in the memory device is reduced to a specific number, the memory device may performs a data merge operation (also called as a garbage collection operation) in an attempt to release new spare physical blocks. Nevertheless, when the host system writes data, if the memory device performs the data merge operation simultaneously, the data writing speed of the host system may become unsteady.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a data storage method, a memory storage device, and a memory control circuit unit in which a data writing speed of the memory storage device is maintained to be steady relative to a host system when the memory storage device performs a data merge operation.

An exemplary embodiment of the disclosure provides a data storage method configured for a rewritable non-volatile memory module, wherein the rewritable non-volatile memory module includes a plurality of physical units, and the data storage method includes: performing a data merge operation; adjusting a data receiving amount per unit time for receiving to-be-written data from a host system according to a data storage state of the rewritable non-volatile memory module; storing the to-be-written data into a buffer memory during the data merge operation being performed; and storing the to-be-written data stored in the buffer memory into the rewritable non-volatile memory module.

Another exemplary embodiment of the disclosure provides a memory storage device including a connection interface unit, a rewritable non-volatile memory module, and a memory control circuit unit. The connection interface unit is configured to be coupled to a host system. The rewritable non-volatile memory module includes a plurality of physical units. The memory control circuit unit is coupled to the connection interface unit and the rewritable non-volatile memory module, wherein the memory control circuit unit is configured to instruct the rewritable non-volatile memory module to perform a data merge operation, wherein the memory control circuit unit is further configured to adjust a data receiving amount per unit time for receiving to-be-written data from the host system according to a data storage state of the rewritable non-volatile memory module, wherein the memory control circuit unit is further configured to store the to-be-written data into a buffer memory during the data merge operation being performed, wherein the memory control circuit unit is further configured to instruct to store the to-be-written data stored in the buffer memory into the rewritable non-volatile memory module.

Another exemplary embodiment of the disclosure provides a memory control circuit unit configured to control a rewritable non-volatile memory module, wherein the rewritable non-volatile memory module includes a plurality of physical units, wherein the memory control circuit unit includes a host interface, a memory interface, a buffer memory, and a memory management circuit. The host interface is configured to be coupled to a host system. The memory interface is coupled to the rewritable non-volatile memory module. The memory management circuit is coupled to the host interface, the memory interface, and the buffer memory, wherein the memory management circuit unit is configured to instruct the rewritable non-volatile memory module to perform a data merge operation, wherein the memory management circuit unit is further configured to adjust a data receiving amount per unit time for receiving to-be-written data from the host system according to a data storage state of the rewritable non-volatile memory module, wherein the memory management circuit is further configured to store the to-be-written data into the buffer memory during the data merge operation being performed, wherein the memory management circuit is further configured to instruct to store the to-be-written data stored in the buffer memory into the rewritable non-volatile memory module.

To sum up, the data storage state of the rewritable non-volatile memory module may be used for adjusting the data receiving amount per unit time for receiving the to-be-written data from the host system. After beginning to perform the data merge operation of the rewritable non-volatile memory module, the to-be-written data received from the host system based on the data receiving amount per unit time is stored into the buffer memory and then stored into the rewritable non-volatile memory module. As such, during the period in which the host system continues to store data into the memory storage device, even though the memory storage device is currently performing the data merge operation, the data writing speed of the memory storage device relative to the host system may be maintained to be steady.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
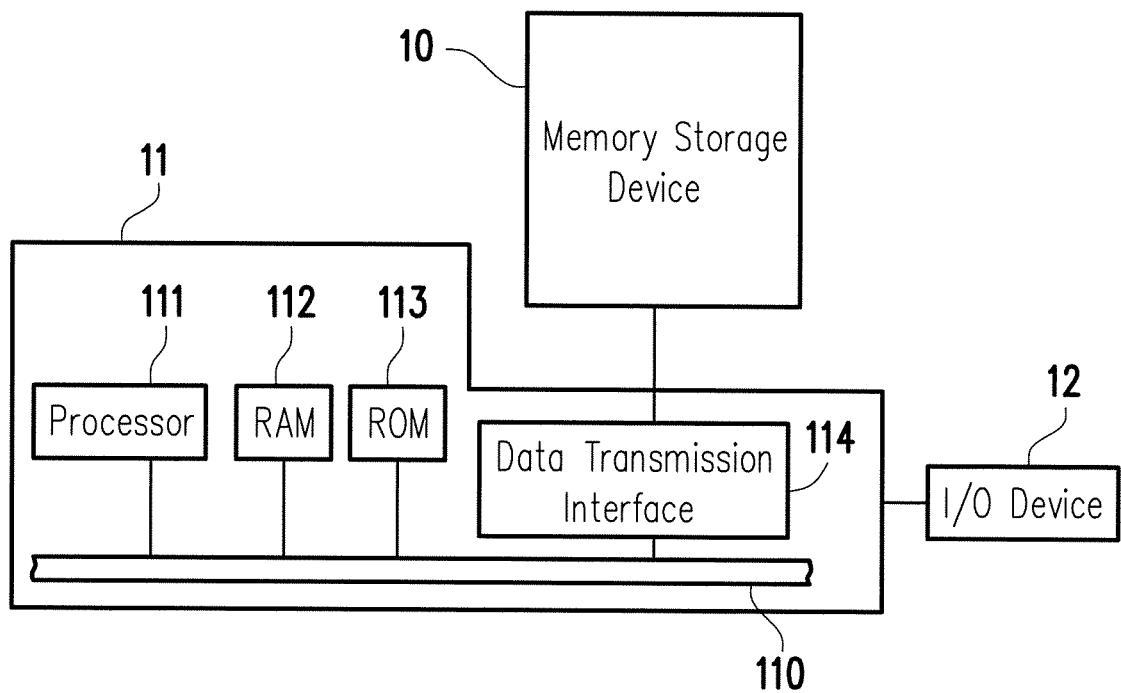
FIG. 1 is a schematic diagram illustrating a host system, a memory storage device, and an input/output (I/O) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also called as a memory storage system) includes a rewritable non-volatile memory module and a controller (also called as a control circuit). The memory storage device is usually configured together with a host system so that the host system may write data into the memory storage device or read data from the memory storage device.

Figure 2:
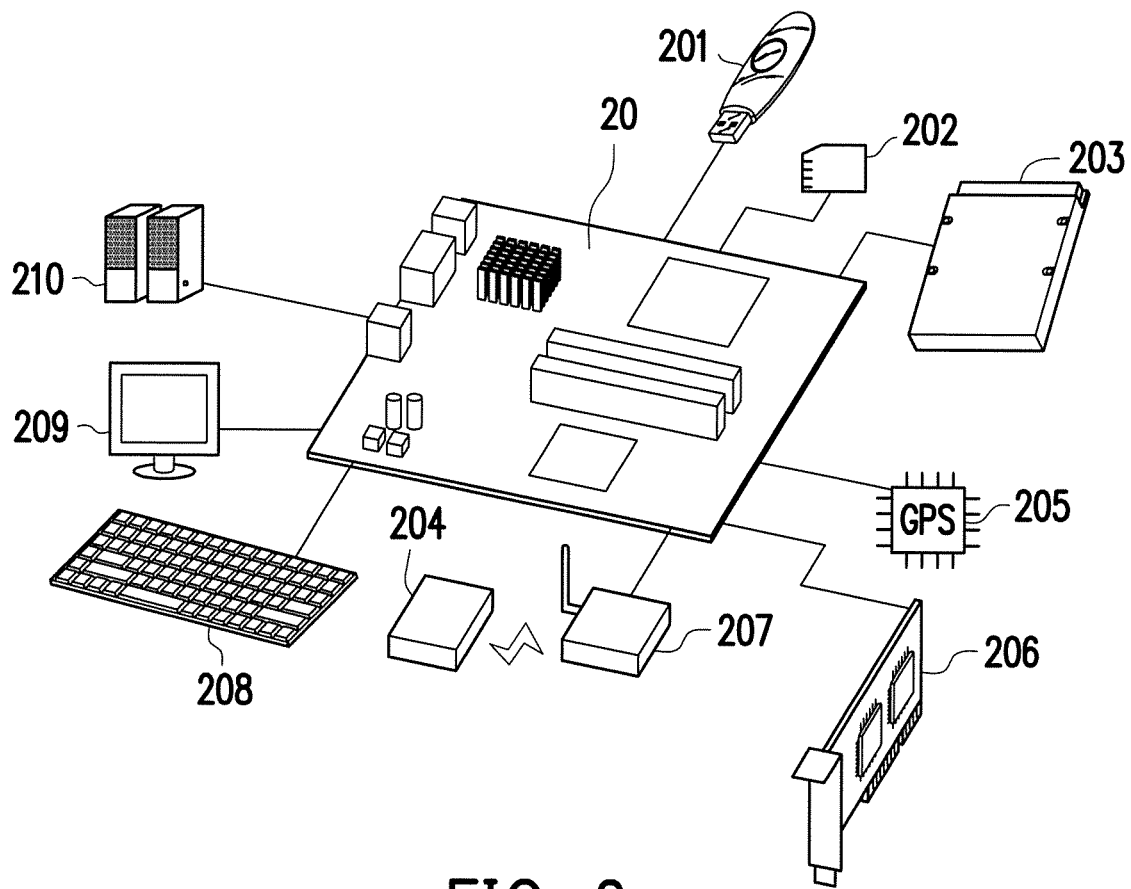
FIG. 2 is a schematic diagram illustrating a host system, a memory storage device, and an I/O device according to another exemplary embodiment of the disclosure.

FIG. 1 is a schematic diagram illustrating a host system, a memory storage device, and an input/output (I/O) device according to an exemplary embodiment of the disclosure. FIG. 2 is a schematic diagram illustrating a host system, a memory storage device, and an I/O device according to another exemplary embodiment of the disclosure.

Referring to FIG. 1 and FIG. 2 together, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In this exemplary embodiment, the host system 11 is coupled to a memory storage device 10 through the data transmission interface 114. For instance, the host system 11 is able to store data into the memory storage device 10 or read data from the memory storage device 10 through the data transmission interface 114. Further, the host system 11 is coupled to an I/O device 12 through the system bus 110. For example, the host system 11 can transmit an output signal to the I/O device 12 or receive an input signal from the I/O device 12 through the system bus 110.

In this exemplary embodiment, the processor 111, the random access memory 112, the read only memory 113, and the data transmission interface 114 may be disposed on a mainboard 20 of the host system 11. The number of the data transmission interface 114 may be one or plural. Through the data transmission interface 114, the mainboard 20 may be coupled to the memory storage device 10 in a wired manner or a wireless manner. The memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies, such as a near field communication (NFC) memory storage device, a wireless fidelity (WiFi) memory storage device, a bluetooth memory storage device, or a low energy bluetooth memory storage device (e.g., iBeacon). Besides, the mainboard 20 may also be coupled to various I/O devices including a global positioning system (GPS) module 205, a network interface card 206, a wireless transmission device 207, a keyboard 208, a monitor 209, and a speaker 210 through the system bus 110. For example, in an exemplary embodiment, the mainboard 20 can access the wireless memory storage device 204 through the wireless transmission device 207.

Figure 3:
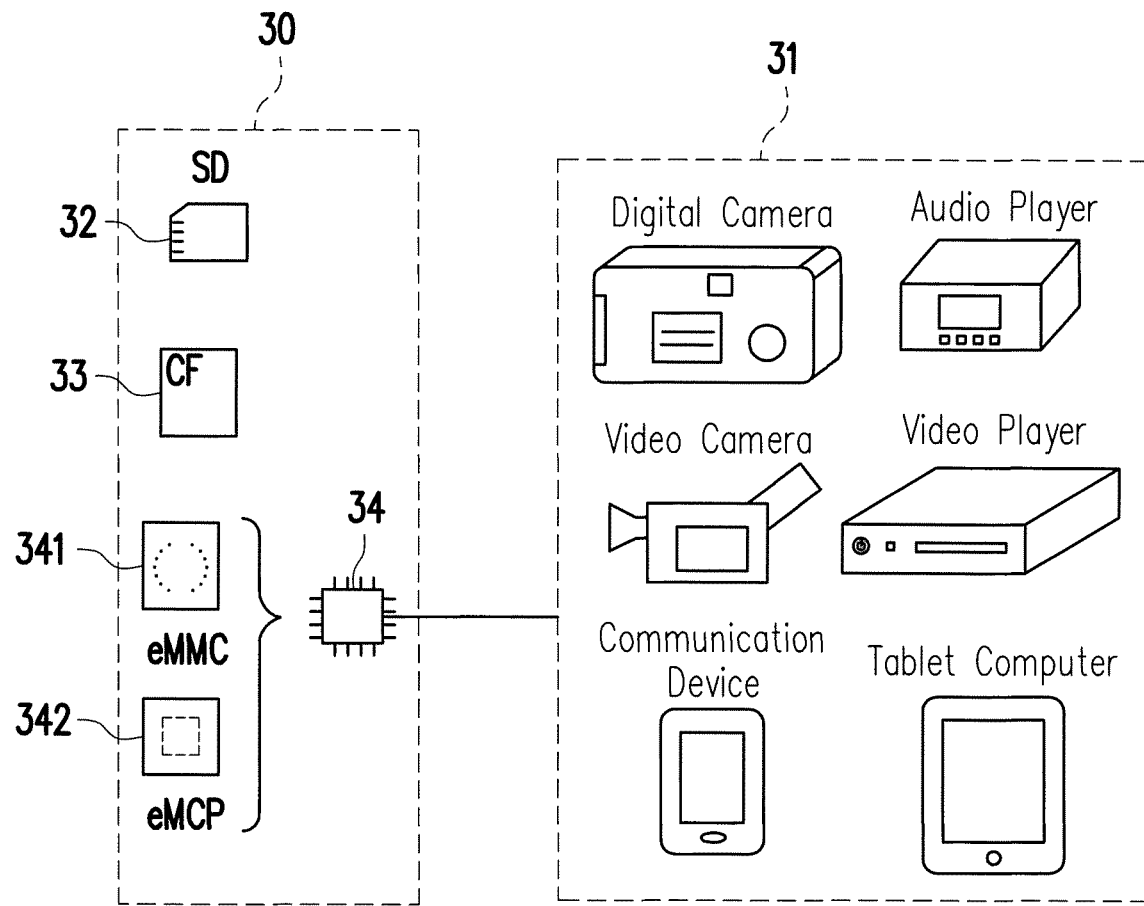
FIG. 3 is a schematic diagram illustrating a host system and a memory storage device according to another exemplary embodiment of the disclosure.

In an exemplary embodiment, the host system mentioned may be any systems capable of substantially cooperating with the memory storage device for storing data. Although the host system is illustrated as a computer system in the foregoing exemplary embodiment; nevertheless, FIG. 3 is a schematic diagram illustrating a host system and a memory storage device according to another exemplary embodiment of the disclosure. Referring to FIG. 3, in another exemplary embodiment, a host system 31 may also be a system including a digital camera, a video camera, a communication device, an audio player, a video player or a tablet computer, whereas a memory storage device 30 can be various non-volatile memory storage devices used by the host system 31, such as a secure digital (SD) card 32, a compact flash (CF) card 33, or an embedded storage device 34. The embedded storage device 34 includes various embedded storage devices capable of directly coupling a memory module onto a substrate of the host system, such as an embedded Multi Media Card (eMMC) 341 and/or an embedded Multi Chip Package (eMCP) storage device 342.

Figure 4:
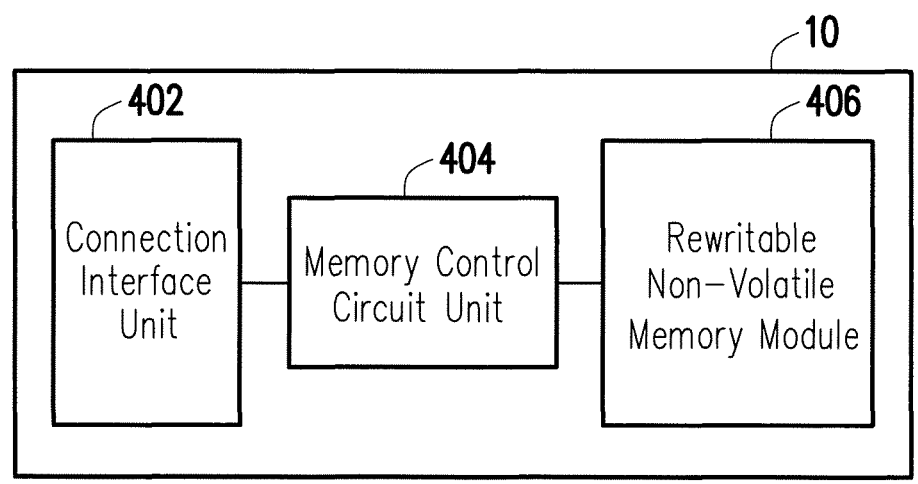
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. In this exemplary embodiment, the connection interface unit 402 is compatible with a Serial Advanced Technology Attachment (SATA) standard. However, it should be noted that the disclosure is not limited thereto, and the connection interface unit 402 may also comply with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi Media Card (MMC) interface standard, the Embedded Multimedia Card (eMMC) interface standard, the Universal Flash Storage (UFS) interface standard, the Compact Flash (CF) interface standard, the Integrated Device Electronics (IDE) interface standard, or other suitable standards. The connection interface unit 402 may be packaged in a chip together with the memory control circuit unit 404, or the connection interface unit 402 may be disposed outside a chip including the memory control circuit unit 404.

The memory control circuit unit 404 is configured to execute a plurality of logic gates or control instructions which are implemented in form of hardware or firmware and to execute operations of writing, reading or erasing data in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 may be a single level cell (SLC) NAND flash memory module (i.e., a flash memory module in which one memory cell stores 1 bit of data), a multi level cell (MLC) NAND flash memory module (i.e., a flash memory module in which one memory cell stores 2 bits of data), a triple level cell (TLC) NAND flash memory module (i.e., a flash memory module in which one memory cell stores 3 bits of data), other types of flash memory modules, or other memory modules having the same characteristics.

Each memory cell in the rewritable non-volatile memory module 406 stores one bit or more bits by change of a voltage (referred to as "threshold voltage" hereinafter). Specifically, a charge trapping layer exists between a control gate of each memory cell and a channel. By applying a write voltage to the control gate, an electron amount of the charge trapping layer is changed, and thereby changing the threshold voltage of the memory cell. The operation of changing the threshold voltage of the memory cell is also called "writing data to the memory cell" or "programming the memory cell". Each memory cell in the rewritable non-volatile memory module 406 has a plurality of storage states according to the change of the threshold voltage. The storage state of the memory cell can be determined by applying a reading voltage, and thereby, obtaining the one or more bits stored in the memory cell.

In this exemplary embodiment, the memory cells of the rewritable non-volatile memory module 406 can constitute a plurality of physical programming units, and the physical programming units can constitute a plurality of physical erasing units. Specifically, the memory cells on the same word line form one physical programming unit or a plurality of physical programming units. If each of the memory cells stores two bits or more bits, the physical programming units on the same word line may at least be categorized as a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in a MLC NAND flash memory module, a writing speed of the lower physical programming unit may be greater than a writing speed of the upper physical programming unit, and/or reliability of the lower physical programming unit is greater than reliability of the upper physical programming unit.

In this exemplary embodiment, the physical programming unit is the smallest unit for programming. That is, the physical programming unit is the minimum unit for writing data. For example, the physical programming unit is the physical page or a physical sector. If the physical programming unit is the physical page, the physical programming units usually include a data bit region and a redundant bit region. The data bit region includes a plurality of physical sectors for storing user data, and the redundant bit region is configured for storing system data (e.g., management data such as an error correcting code). In this exemplary embodiment, the data bit region includes 32 physical sectors, and the size of each of the physical sectors is 512 bytes (B). However, in other exemplary embodiments, the data bit region may include 8, 16, or more or fewer physical sectors. A size of each of the physical sectors may be greater or smaller. On the other hand, the physical erasing unit is the minimum unit for erasing. Namely, each physical erasing unit contains the least number of memory cells to be erased together. The physical erase unit is a physical block, for example.

Figure 5:
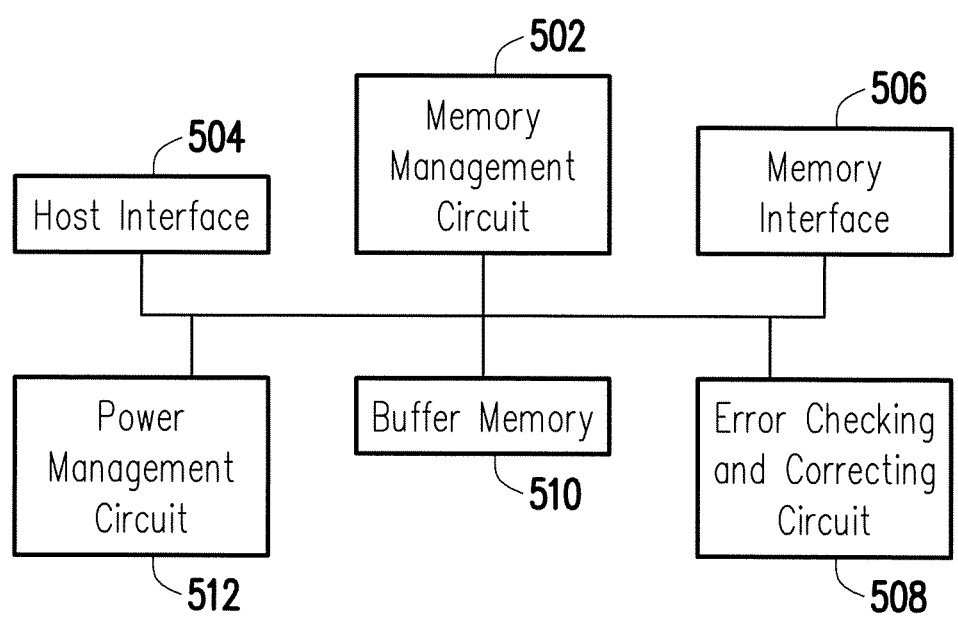
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504, a memory interface 506, and a buffer memory 510.

The memory management circuit 502 is configured to control overall operations of the memory control circuit unit 404. Specifically, the memory management circuit 502 has a plurality of control commands. When the memory storage device 10 is operated, the control commands are executed to perform various operations such as data writing, data reading, and data erasing. The following description of the operation of the memory management circuit 502 is equivalent to the description of the operation of the memory control circuit unit 404.

In this exemplary embodiment, the control instructions of the memory management circuit 502 are implemented in form of firmware. For instance, the memory management circuit 502 has a microprocessor unit (not shown) and a read-only memory (not shown), and the control commands are burnt into the read-only memory. When the memory storage device 10 is operated, the control commands are executed by the microprocessor unit for performing various data operations, such as data writing, data reading, and data erasing.

In another exemplary embodiment, the control commands of the memory management circuit 502 may also be stored in a specific region (for example, a system region in the memory module exclusively used for storing system data) of the rewritable non-volatile memory module 406 in the form of program codes. Moreover, the memory management circuit 502 has the microprocessor unit (not shown), the read-only memory (not shown), and a random access memory (not shown). In particular, the read-only memory has a boot code. When the memory control circuit unit 404 is enabled, the boot code is first executed by the microprocessor unit for loading the control commands stored in the rewritable non-volatile memory module 406 to the random access memory of the memory management circuit 502. Afterwards, the microprocessor unit executes the control commands for various data operations such as data writing, data reading, and data erasing.

In addition, in another exemplary embodiment, the control commands of the memory management circuit 502 may be implemented in a hardware form. For example, the memory management circuit 502 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microprocessor. The memory management circuit is configured to manage the memory cells or the memory cell groups of the rewritable non-volatile memory module 406. The memory writing circuit is configured to issue a write command sequence to the rewritable non-volatile memory module 406 so as to write data into the rewritable non-volatile memory module 406. The memory reading circuit is configured to issue a read command sequence to the rewritable non-volatile memory module 406 so as to read data from the rewritable non-volatile memory module 406. The memory erasing circuit is configured to issue an erase command sequence to the rewritable non-volatile memory module 406 so as to erase data from the rewritable non-volatile memory module 406. The data processing circuit is configured to process data to be written into the rewritable non-volatile memory module 406 and data to be read from the rewritable non-volatile memory module 406. The write command sequence, the read command sequence, and the erase command sequence may respectively include one or more program codes or command codes and are configured to instruct the rewritable non-volatile memory module 406 to execute corresponding data operations such as data writing, data reading, and data erasing. In an exemplary embodiment, the memory management circuit 502 can further issue other types of command sequences to the rewritable non-volatile memory module 406 for instructing to execute corresponding operations.

The host interface 504 is coupled to the memory management circuit 502 and is configured for receiving and identifying commands and data sent from the host system 11. In other words, the commands and the data sent from the host system 11 are transmitted to the memory management circuit 502 through the host interface 504. In this exemplary embodiment, the host interface 504 is compatible with the SATA standard. However, it should be understood that the disclosure is not limited thereto, and the host interface 504 may also be compatible to a PATA standard, an IEEE 1394 standard, a PCI Express standard, a USB standard, a SD standard, a UHS-I standard, a UHS-II standard, a MS standard, a MMC standard, an eMMC standard, a UFS standard, a CF standard, an IDE standard, or other suitable standards for data transmission.

The memory interface 506 is coupled to the memory management circuit 502 and is configured to access the rewritable non-volatile memory module 406. In other words, data to be written to the rewritable non-volatile memory module 406 is converted into a format acceptable to the rewritable non-volatile memory module 406 through the memory interface 506. Specifically, when the memory management circuit 502 is to access the rewritable non-volatile memory module 406, the memory interface 506 sends corresponding command sequences. For instance, the command sequences may include a write command sequence instructing data-writing, a read command sequence instructing data-reading, an erasing command sequence instructing data-erasing, and corresponding command sequences configured for instructing various memory operations (e.g., changing reading voltage levels or executing garbage collection, etc.). The command sequences are, for example, generated by the memory management circuit 502 and sent to the rewritable non-volatile memory module 406 through the memory interface 506. The command sequences may include one or more signals or data on the bus. The signals or the data may include command codes or program codes. For example, a read command sequence includes information, such as identification code and memory address, of the reading.

The buffer memory 510 is coupled to the memory management circuit 502 and is configured to temporarily store data and commands from the host system 11 or data from the rewritable non-volatile memory module 406.

In an exemplary embodiment, the memory control circuit unit 404 further includes an error checking and correcting circuit 508 and a power management circuit 512.

The error checking and correcting circuit 508 is coupled to the memory management host circuit 502 and is configured to execute an error checking and correcting operation to ensure the correctness of data. To be more specific, when the memory management circuit 502 receives a write command from the host system 11, the error checking and correcting circuit 508 generates a corresponding error correcting (ECC) code and/or an error detecting code (EDC) for the data corresponding to the write command, and the memory management circuit 502 writes the data corresponding to the write command and the corresponding error correcting code and/or the error detecting code to the rewritable non-volatile memory module 406. Afterward, when the memory management circuit 502 reads the data from the rewritable non-volatile memory module 406, the corresponding error correcting code and/or the error detecting code is also read simultaneously, and the error checking and correcting circuit 508 executes error checking and correcting operations for the read data based on the error correcting code and/or the error detecting code. The power management unit 512 is coupled to the memory management circuit 502 and is configured to control power of the memory storage device 10.

Figure 6:
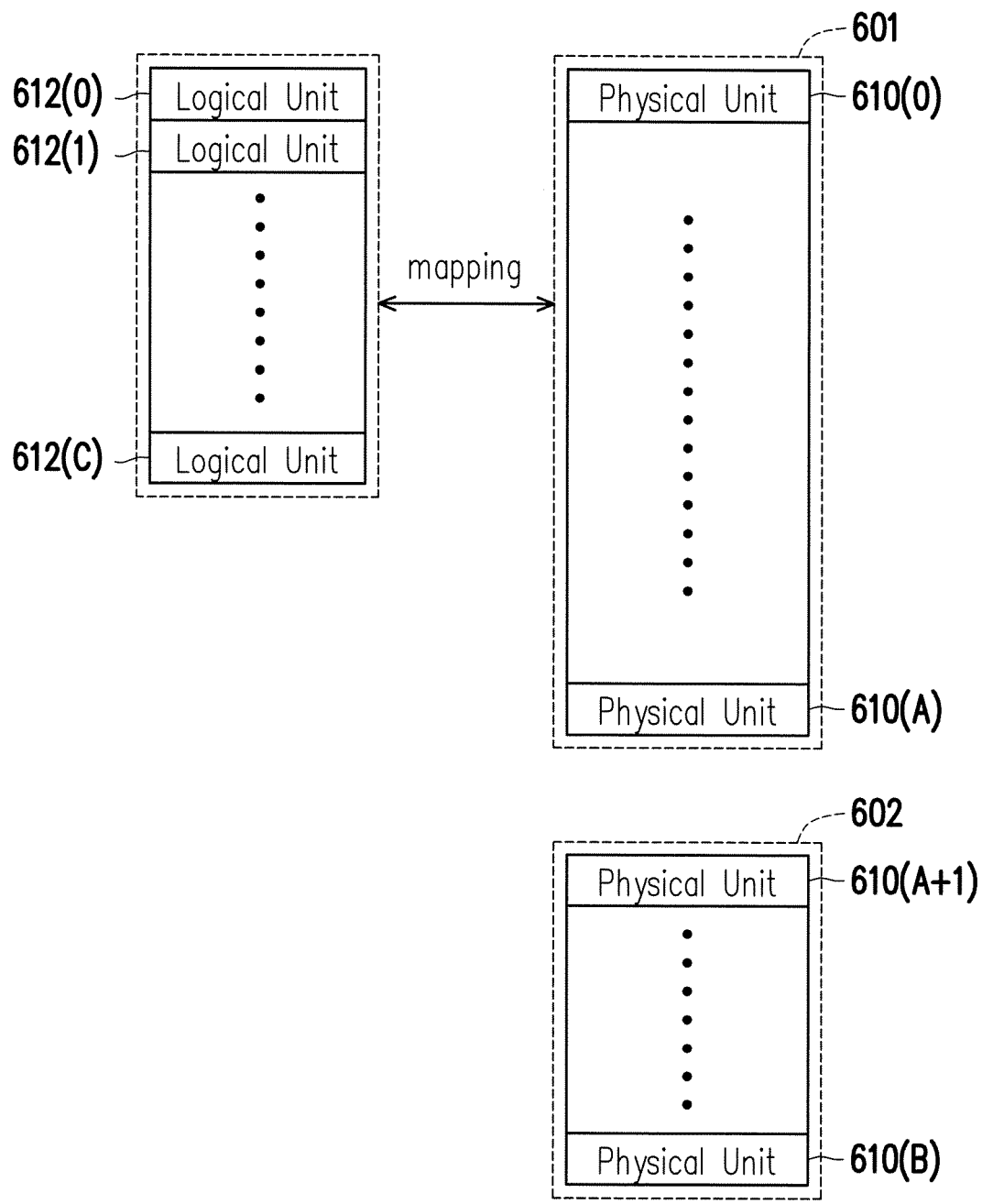
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 logically groups physical units 610(0) to 610(B) of the rewritable non-volatile memory module 406 into a storage region 601 and a spare region 602. The physical units 610(0) to 610(A) in the storage region 601 have data stored. For instance, the data stored in the storage region 601 includes valid data and invalid data. The physical units 610(A+1) to 610(B) in the spare region 602 are yet to be used for storing data. When data is intended to be stored, the memory management circuit 502 selects one physical unit in the physical units 610(A+1) to 610(B) from the spare region 602 and stores the data from the host system 11 or from other physical units in the storage region 601 into the selected physical unit. At the same time, the selected physical unit is associated with the storage region 601. Besides, after erasing one of the physical units in the storage region 601, the erased physical unit is re-associated with the spare region 602.

In this exemplary embodiment, each of the physical units belonging to the spare region 602 is also called as a spare physical unit, and each of the physical units belonging to the storage region 601 is also called as a non-spare physical unit. In this exemplary embodiment, one physical unit refers to one physical erase unit. Nevertheless, in another exemplary embodiment, one physical unit may also include a plurality of physical erase units.

The memory management circuit 502 allocates logical units 612(0) to 612(C) to be mapped to the physical units 610(0) to 610(A) in the storage region 601. In this exemplary embodiment, each of the logical units refers to a logical address. Nevertheless, in another exemplary embodiment, one logical unit may also refer to a logical programming unit, a logical erase unit, or may be composed of a plurality of consecutive or inconsecutive logical addresses. In addition, each of the logical units 612(0) to 612(C) may be mapped to one or more physical units.

The memory management circuit 502 records a mapping relationship (also called as a logical-physical address mapping relationship) between the logical units and the physical units in at least one logical-physical mapping table. When the host system 11 intends to read data from the memory storage device 10 or to write data to the memory storage device 10, the memory management circuit 502 may perform the data access operation of the memory storage device 10 according to the at least one logical-physical mapping table.

It is noted that in the following description, some terms may be replaced with corresponding abbreviations for ease of reading (see Table 1).

TABLE 1

| | |
|---|---|
| rewritable non-volatile memory module | RNVM module |
| logical unit | LU |
| physical unit | PU |
| memory management circuit | MMC |

In this exemplary embodiment, the valid data is the latest data belonging to one LU, and the invalid data is not the latest data belonging to any of the LUs. For instance, if the host system 11 stores new data into one LU and overwrites old data previously stored in this LU (i.e., updates data belonging to this LU), this new data stored in the storage region 601 is the latest data belonging to this LU and is marked as valid, and the overwritten old data may still be stored in the storage region 601 but is marked as invalid.

In this exemplary embodiment, if data belonging to one LU is updated, the mapping relationship between this LU and the PU storing the old data belonging to this LU is removed, and a mapping relationship between this LU and the PU storing the latest data belonging to this LU is established. Nevertheless, in another exemplary embodiment, if data belonging to one LU is updated, the mapping relationship between this LU and the PU storing the old data belonging to this LU can still be maintained.

When the memory storage device 10 is shipped, a total number of the PUs belonging to the spare region 602 is a predetermined number (e.g., 30). When the memory storage device 10 is operated, PUs are selected from the spare region 602 and are associated with the storage region 601 for storing data (e.g., user data from the host system 11). Therefore, the total number of the PUs belonging to the spare region 602 may gradually decrease as the memory storage device 10 is used.

When the memory storage device 10 is operated, the MMC 502 continues to update the total number of the PUs belonging to the spare region 602. The MMC 502 performs a data merge operation according to the number (i.e., the total number of the spare PUs) of the PUs in the spare region 602. For instance, the MMC 502 may determine whether the total number of the PUs belonging to the spare region 602 is less than or equal to a threshold value (also called as a first threshold value). The first threshold value is a value of, for example, 2 or greater (e.g., 10), but the disclosure is not limited thereto. If the total number of the PUs belonging to the spare region 602 is less than or equal to the first threshold value, the MMC 502 performs the data merge operation. In an exemplary embodiment, the data merge operation is also called as a garbage collection operation.

In the data merge operation, the MMC 502 selects at least one PU (also called as a source node) from the storage region 601 and attempts to collect and copy the valid data from the selected PU to another PU (also called as a recycle node). The PU configured to store the copied valid data is selected from the spare region 602 and is then associated with the storage region 601. If the valid data stored in one PU is entirely copied to the recycle node, this PU is then erased and is associated with the spare region 602. In an exemplary embodiment, an operation to re-associate one PU with the spare region 602 from the storage region 601 (or an operation to erase one PU) is also called as releasing one spare PU. Through performing the data merge operation, one or more spare PUs are released, such that the total number of the PUs belonging to the spare region 602 gradually increases.

After beginning to perform the data merge operation, if the PUs belonging to the spare region 602 meet one certain condition, the data merge operation may stop. For instance, the MMC 502 may determine whether the total number of the PUs belonging to the spare region 602 is greater than or equal to a threshold value (also called as a second threshold value hereinafter). For instance, the second threshold value may be greater than or equal to the first threshold value. If the total number of the PUs belonging to the spare region 602 is greater than or equal to the second threshold value, the MMC 502 may stop the data merge operation. For example, stopping the data merge operation refers to ending the data merge operation currently being performed. After stopping the data merge operation, if the total number of the PUs belonging to the spare region 602 is once again less than or equal to the first threshold value, the next data merge operation is performed again so as to release the new spare PU.

Figure 7:
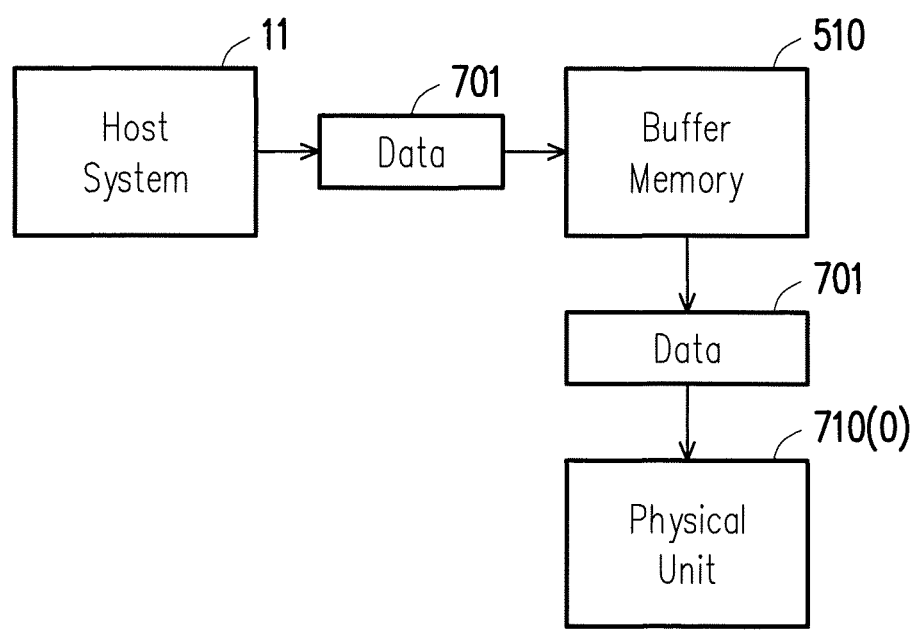
FIG. 7 is a schematic diagram illustrating an operation of receiving and storing data from a host system according to an exemplary embodiment of the disclosure.
Figure 8:
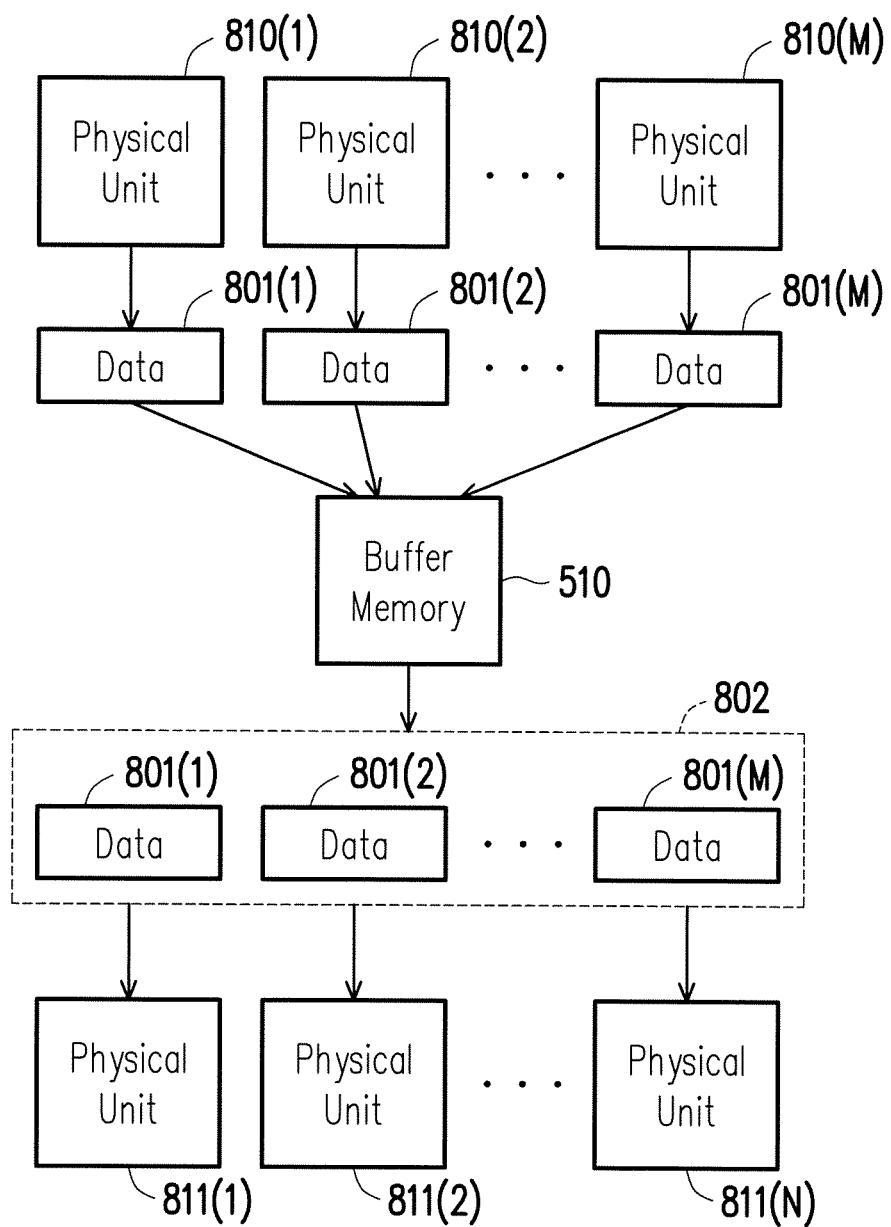
FIG. 8 is a schematic diagram illustrating a data merge operation according to an exemplary embodiment of the disclosure.

FIG. 7 is a schematic diagram illustrating an operation of receiving and storing data from a host system according to an exemplary embodiment of the disclosure. FIG. 8 is a schematic diagram illustrating a data merge operation according to an exemplary embodiment of the disclosure.

Referring to FIG. 7, when the host system 11 attempts to store data 701 (also called as to-be-written data), the data 701 is received from the host system 11 and stored into the buffer memory 510. Then, at a specific time point, the data 701 may be read from the buffer memory 510 and stored into a PU 710(0). For example, the PU 710(0) may be at least one PU selected from the spare region 602 of FIG. 6. In addition, the specific time point may be a time point when a storage state of the buffer memory 510 meets one specific condition (e.g., the buffer memory 510 is fully written) or a time point after the data 701 is stored into the buffer memory 510. In an exemplary embodiment, the PU 710(0) currently configured to store the data from the host system 11 is also called as an open block. If the PU 710(0) currently acting as the open block is fully written, another spare PU is selected to act as a new open block and is configured to store the data from the host system 11.

Referring to FIG. 8, in the data merge operation, PUs 810(1) to 810(M) storing the valid data are selected to act as the source nodes of the valid data, and PUs 811(1) to 811(N) are selected to act as the recycle nodes of the valid data. For example, the PUs 810(1) to 810(M) are the PUs selected from the storage region 601 of FIG. 6, and the PUs 811(1) to 811(N) are the PUs selected from the spare region 602 of FIG. 6. M and N are both positive integers, and M may be greater than N.

In the data merge operation, data 801(1) to 801(M) may be read from the PUs 810(1) to 810(M) and stored into the buffer memory 510. In an exemplary embodiment, all of the data 801(1) to 801(M) is valid data. In another exemplary embodiment, the data 801(1) to 801(M) may also include part of the invalid data or dummy data. Then, at a specific time point, data 802 (including data 801(1) to 801(M)) may be read from the buffer memory 510 and written into the PUs 811(1) to 811(N). For instance, this specific time point may be a time point when the storage state of the buffer memory 510 meets one specific condition (e.g., the buffer memory 510 is fully written) or a time point after at least part of the data 801(1) to 801(M) are stored into the buffer memory 510. Note that the operation of receiving and storing the data from the host system 11 in FIG. 7 and the data merge operation in FIG. 8 may be performed simultaneously. For instance, when receiving and storing the data from the host system 11, the data merge operation may be performed in the background.

In an exemplary embodiment, if one PU is currently configured as the open block, this PU is not regarded as a recycle node before this PU is erased. Similarly, if one PU is currently configured as the recycle node, this PU is not regarded as the open block before this PU is erased. After one PU is erased, this PU may continuously be selected to act as the open block or the recycle node.

In an exemplary embodiment, the MMC 502 may dynamically adjust a data receiving amount per unit time for receiving the to-be-written data from the host system 11 according to a data storage state of the RNVM module 406. Herein, the data storage state may be a quantity, a proportion, or a distribution, etc. of valid data or invalid data, for example, in one or more PUs of one region of the RNVM module 406. The data receiving amount per unit time may correspond to a to-be-written data transmission parameter. In an exemplary embodiment, the data receiving amount per unit time may also be regarded to as being controlled by the to-be-written data transmission parameter. The MMC 502 may achieve the required data receiving amount per unit time by adjusting the to-be-written data transmission parameter. In addition, the data receiving amount per unit time is configure to indicate, control, or limit the data amount of the to-be-written data received from the host system 11 per unit time.

In an exemplary embodiment, the to-be-written data transmission parameter (or the data receiving amount per unit time) may reflect a data transmission speed (also called as a to-be-written data transmission speed), a data transmission amount, a data transmission time, or a data sending time interval, etc. for receiving the to-be-written data from the host system 11, meaning that the to-be-written data transmission parameter (or the data receiving amount per unit time) may be or may correspond to at least one of the foregoing information.

In an exemplary embodiment, the to-be-written data transmission parameter include at least one of an event execution time parameter, an event state reply time parameter, a bandwidth limitation parameter, a frequency limitation parameter, and a packet capacity parameter. The event execution time parameter is configured to reflect or control a time interval and/or frequency for (actively or passively) receiving the to-be-written data from the host system 11. The event state reply time parameter is configured to reflect or control a time interval and/or frequency for replying a writing completion message to the host system 11. For instance, the host system 11 may continue to transmit the next to-be-written data to the memory storage device 10 only after the writing completion message of a previous to-be-written data is received from the memory storage device 10. The bandwidth limitation parameter is configured to reflect or control a data transmission bandwidth for receiving the to-be-written data from the host system 11. The frequency limitation parameter is configured to reflect or control a clock frequency of the memory storage device 10 (or the connection interface unit 402) for analyzing the to-be-written data from the host system 11. The packet capacity parameter is configured to reflect or control a capacity of one data unit for transmitting the to-be-written data from the host system 11. For instance, the capacity of one data unit may be 4 kilobytes or greater or less. These parameters above may all be configured to control the data receiving amount per unit time for receiving the to-be-written data from the host system 11. The to-be-written data transmission parameter may be dynamically adjusted, such that the data receiving amount per unit time for receiving the to-be-written data from the host system 11 may also be dynamically changed.

During the data merge operation being performed, the MMC 502 may dynamically adjust an amount or time for receiving the to-be-written data from the host system 11 and store the received to-be-written data into the buffer memory 510. Afterwards, the MMC 502 stores the data stored in the buffer memory 510 into the RNVM module 406.

In an exemplary embodiment, during the data merge operation being performed, the MMC 502 may maintain a speed for receiving the data from the host system 11 to be identical to the determined data receiving amount per unit time. For instance, if the current data receiving amount per unit time is determined to be 200 MB/s, during the data merge operation being performed, the speed for receiving the data from the host system 11 may be maintained at 200 MB/s.

In an exemplary embodiment, during the data merge operation being performed, if a current data receiving speed is less than the determined data receiving amount per unit time, the MMC 502 may allow and/or attempt to increase the current data receiving speed to be equal to or close to the data receiving amount per unit time. For instance, the MMC 502 may increase a transmission bandwidth for receiving the data from the host system 11 and/or increase a frequency for replying the writing completion message to the host system 11.

In an exemplary embodiment, during the data merge operation being performed, if the current data receiving speed is greater than the determined data receiving amount per unit time, the MMC 502 may attempt to decrease the current data receiving speed to be equal to or close to the data receiving amount per unit time. For instance, the MMC 502 may decrease the transmission bandwidth for receiving the data from the host system 11, suspend reception for the data from the host system 11, and/or decrease the frequency for replying the writing completion message to the host system 11, etc. Note that in other exemplary embodiments, some other transmission speed control mechanisms that are not mentioned may also be adopted, as long as the transmission speed control mechanisms can be used to adjust the data receiving amount per unit time for receiving the data from the host system 11.

In an exemplary embodiment, the data storage state of the RNVM module 406 refers to a valid data storage state of the RNVM module 406. The valid data storage state of the RNVM module 406 corresponds to a distribution state of the valid data in the RNVM module 406. In an exemplary embodiment, the data storage state of the RNVM module 406 refers to an invalid data storage state of the RNVM module 406. The invalid data storage state of the RNVM module 406 corresponds to a distribution state of the invalid data in the RNVM module 406. In an exemplary embodiment, the valid data storage state and the invalid data storage state are the same concept for representing the data storage state of the valid data and/or the invalid data, such that the data storage state of the RNVM module 406 may refer to any one of the valid data storage state and the invalid data storage state of the RNVM module 406. The disclosure is not limited thereto. In the example shown in the following exemplary embodiment, the valid data storage state acts as the data storage state of the RNVM module 406. People having ordinary skill in the art should know how to replace the valid data with the invalid data for acquiring corresponding operational results.

In an exemplary embodiment, the data management circuit 502 may obtain the data storage state of the RNVM module 406 according to valid counts of at least some of the PUs in the RNVM module 406. Herein, the valid count of one PU reflects a data amount of valid data stored in this PU. For instance, if the valid count of one PU is 20, meaning that in this PU, data currently stored in 20 physical programming units is valid data. Alternatively, it may also be viewed as the data amount of the valid data stored in this PU is equal to a total capacity of the 20 physical programming units. Through analyzing the valid count of at least one PU, the MMC 502 may obtain a distribution state of the valid data (and/or the invalid data) in the RNVM module 406. In addition, the MMC 502 may obtain the information related to the distribution/storage of the valid data stored in the RNVM module 406, such as the total data amount of the valid data, according to the valid count. These information may be regarded as the data storage state of the RNVM module 406.

In an exemplary embodiment, the MMC 502 may evaluate a release action of spare PU corresponding to the data merge operation currently being performed or about to be performed according to the data storage state of the RNVM module 406. For instance, the evaluated release action of spare PU may be presented by information related to a release efficiency of the PUs in the data merge operation, such as a release rate (also called as a PU release rate) of the PU in the data merge operation being performed or about to be performed, a release speed (also called as a PU release speed) of the PU in the data merge operation being performed or about to be performed, and a release time (also called as a PU release time) of the PU in the data merge operation being performed or about to be performed. Then, the MMC 502 may determine the data receiving amount per unit time according to the evaluated release action of spare PU. Taking FIG. 8 as an example, in the data merge operation, if it is estimated that the valid data is collected from the PUs 810(1) to 810(M), the collected valid data is stored into the PUs 811(1) to 811(N), and one new spare PU may be additionally released (i.e., M−N=1), then the release rate of spare PU corresponding to the evaluated release action of spare PU may be determined as 1/N. In other words, after completing the valid data writing operation for N PUs, 1 new spare PU may be additionally released.

In an exemplary embodiment, the data management circuit 502 may obtain individual valid count of at least some of the non-spare PUs in the RNVM module 406 and evaluate the release action of spare PU according to the obtained valid count. For instance, through analyzing the individual valid count of at least some of the non-spare PUs, the MMC 502 may obtain the data amount of the valid data respectively stored in the non-spare PUs. According to the data amount of the valid data respectively stored in the non-spare PUs, the MMC 502 may evaluate that a valid data writing operation for a specific number of PUs is required to be completed in the data merge operation currently being performed or to be performed, so as to additionally release 1 new spare PU. For instance, if the valid data respectively occupies for 60%, 65%, and 75% of a data capacity in three PUs selected as the source nodes, meaning that after two PUs (i.e., the recycle nodes) are used to store the collected valid data, one new spare PU may be additionally released (3−2=1). In this example, the release rate of spare PU corresponding to the evaluated release action of spare PU may be determined to be ½ (i.e., N=2).

Figure 9:
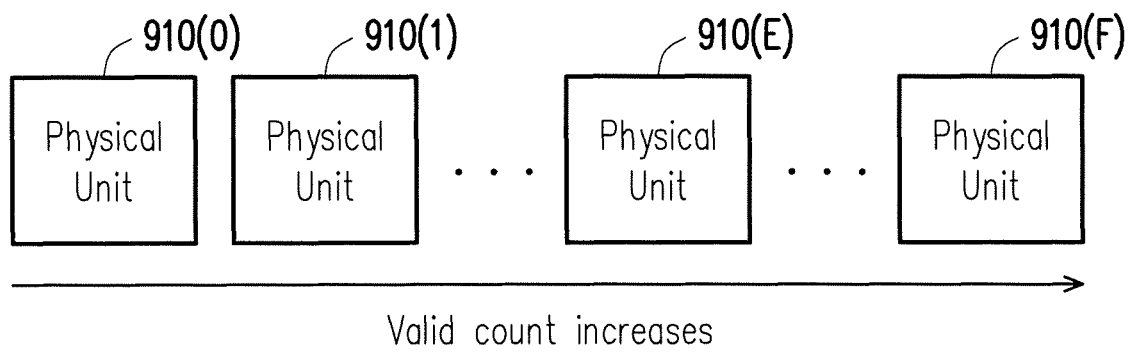
FIG. 9 is a schematic diagram of sorting physical units according to valid counts according to an exemplary embodiment of the disclosure.

FIG. 9 is a schematic diagram of sorting PUs according to valid counts according to an exemplary embodiment of the disclosure.

Referring to FIG. 9, PUs 910(0) to 910(F) may include all of the PUs in the storage region 601 of FIG. 6 or may only include at least some of the PUs storing the valid data in the storage region 601. The PUs 910(0) to 910(F) may be sorted according to the individual valid count of the PUs 910(0) to 910(F). For example, the valid counts of the PUs 910(0) to 910(F) increase gradually from left to right. The data merge operation prioritizes to collect the valid data from the PUs with less valid data stored, so as to increase a performance efficiency (or the release rate of spare PU).

In an exemplary embodiment, valid counts of the PUs 910(0) to 910(F) may be used to evaluate the release action of spare PU corresponding to the data merge operation for the PUs 910(0) to 910(F). In an exemplary embodiment, the release action of spare PU may also be evaluated only according to the valid counts of the several PUs with the least valid counts (e.g., the 20 PUs 910(0) to 910(19) with the least valid counts) among the PUs 910(0) to 910(F). Alternatively, in an exemplary embodiment, the release action of spare PU may be evaluated according only to the valid count of a single PU in the PUs 910(0) to 910(F). For instance, if the valid count of the PU 910(E) indicates that the valid data accounts for 95% of the data capacity in the PU 910(E), it may thus be estimated, according to the valid count, that after using 20 PUs to store the valid data collected in the data merge operation currently being performed or to be performed, 1 new spare PU may be additionally released (i.e., the release rate of spare PU is 1/20). In an exemplary embodiment, E may be 10 or greater or less.

In an exemplary embodiment, the MMC 502 may control a speed of receiving the data from the host system 11 (or the data receiving amount per unit time) such that one new spare PU is additionally released when one open block is fully written in the data merge operation performed in the background. For instance, in the exemplary embodiment in which the release rate of spare PU is 1/N, each time N PUs are fully written by using the collected valid data, 1 new spare PU is additionally released. As such, a total data writing time for fully writing 1 open block may be maintained at less than or equal to a total data writing time for fully writing N PUs. In other words, if one PU includes 256 physical programming units, the time of fully writing one open block (including 256 physical programming units) may be maintained at less than or equal to a time of fully writing N recycle nodes (including N×256 physical programming units). Therefore, a data writing speed of the open block (or the data receiving amount per unit time) may be maintained at less than or equal to 1/N times of the data writing speed of the data merge operation.

In an exemplary embodiment, the MMC 502 may determine the data receiving amount per unit time and/or the corresponding to-be-written data transmission parameter according to the data writing speed of the data merge operation currently being performed or to be performed and the evaluated release action of spare PU. For instance, the release rate of spare PU corresponding to the evaluated release action of spare PU may be multiplied by the data writing speed of the data merge operation by the MMC 502, and thus the data receiving amount per unit time is obtained. For instance, if the evaluated release rate of spare PU is 1/N, and the data writing speed (or a data writing bandwidth) of the data merge operation currently being performed or to be performed is 400 MB/s, the data receiving amount per unit time for receiving the to-be-written data from the host system 11 may be determined to be 400/N MB/s. For instance, in the example in which the release rate of spare PU is ½ and the data writing speed of the data merge operation currently being performed or to be performed is 400 MB/s, the data receiving amount per unit time may be determined to be 200 MB/s. Alternatively, in the example in which the release rate of spare PU is 1/20 and the data writing speed of the data merge operation currently being performed or to be performed is 400 MB/s, the data receiving amount per unit time may be determined to be 20 MB/s.

In the foregoing exemplary embodiment, the release rate of spare PU is positively relative to the determined data receiving amount per unit time. In other words, the greater the evaluated release rate of spare PU (the less the N is), the greater the determined data receiving amount per unit time. From another aspect, in an exemplary embodiment, a time required for execution of the release action of spare PU may be negatively relative to the determined data receiving amount per unit time. For instance, if longer time for execution is required to execute the data merge operation for releasing a new spare PU, meaning that the release rate of spare PU of the data merge operation is relatively low and the determined data receiving amount per unit time may be relatively less. On the contrary, if shorter time for execution is required to execute the data merge operation for releasing a new spare PU, meaning that the release rate of spare PU of the data merge operation is relatively high and the determined data receiving amount per unit time may be relatively great.

In an exemplary embodiment, by receiving the to-be-written data from the host system 11 based on the determined data receiving amount per unit time, the MMC 502 may not limit the data writing speed of the data merge operation currently being performed or to be performed. In other words, when the data writing operation of the host system 11 and the data merge operation of the memory storage device 10 itself are synchronously performed, the MMC 502 controls or limits the data receiving amount per unit time for the to-be-written data from the host system 11 but allows the data merge operation to store the collected valid data by using a highest data writing speed (or the highest transmission bandwidth). From another aspect, through lowering the data receiving amount per unit time for the to-be-written data from the host system 11 and maintaining the data merge operation to be performed at full speed, the data writing speed of the host system 11 may be maintained to be steady without lowering a performance efficiency of the data merge operation. In one exemplary embodiment, maintaining the data writing speed of the host system 11 to be steady means that the data writing speed of the host system 11 is maintained within a value zone or greater than a predetermined value.

In an exemplary embodiment of FIG. 7 and FIG. 8, the buffer memory 510 transmits data temporarily stored in the buffer memory 510 to the open block (i.e., the PU 710(0)) or the recycle nodes (i.e., the PUs 811(1) to 811(N)) for storage based on the first in first out (FIFO) rule. The MMC 502 controls or adjusts the data receiving speed of receiving data from the host system 11 according to the determined data receiving amount per unit time but may not influence the data storage rule, the data output rule, or the data output bandwidth of the buffer memory 510.

In an exemplary embodiment, the data receiving amount per unit time for receiving the to-be-written data from the host system 11 during a period of performing the data merge operation is controlled to be lower than a data receiving amount per unit time for receiving the to-be-written data from the host system 11 during a period of not performing the data merge operation.

Figure 10:
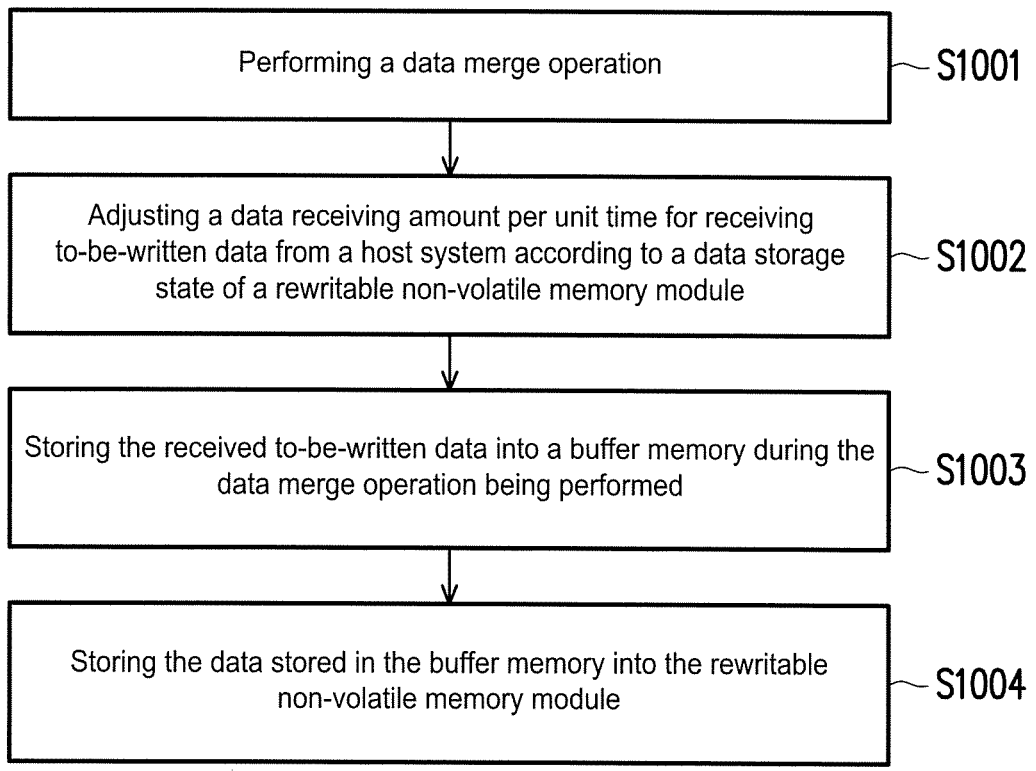
FIG. 10 is a flowchart illustrating a data storage method according to an exemplary embodiment of the disclosure.

FIG. 10 is a flowchart illustrating a data storage method according to an exemplary embodiment of the disclosure.

Referring to FIG. 10, in step S1001, a data merge operation is performed. In step S1002, a data receiving amount per unit time for receiving to-be-written data from a host system is adjusted according to a data storage state of a RNVM module. In step S1003, the received to-be-written data is stored into a buffer memory during the data merge operation being performed. In step S1004, the data stored in the buffer memory is stored into the RNVM module. Note that the disclosure does not intend to limit the order of step S1001 and step S1002 to be performed. For example, in an exemplary embodiment, step S1002 may be performed before step S1001 is performed, or step S1001 and step S1002 may be performed simultaneously.

Figure 11:
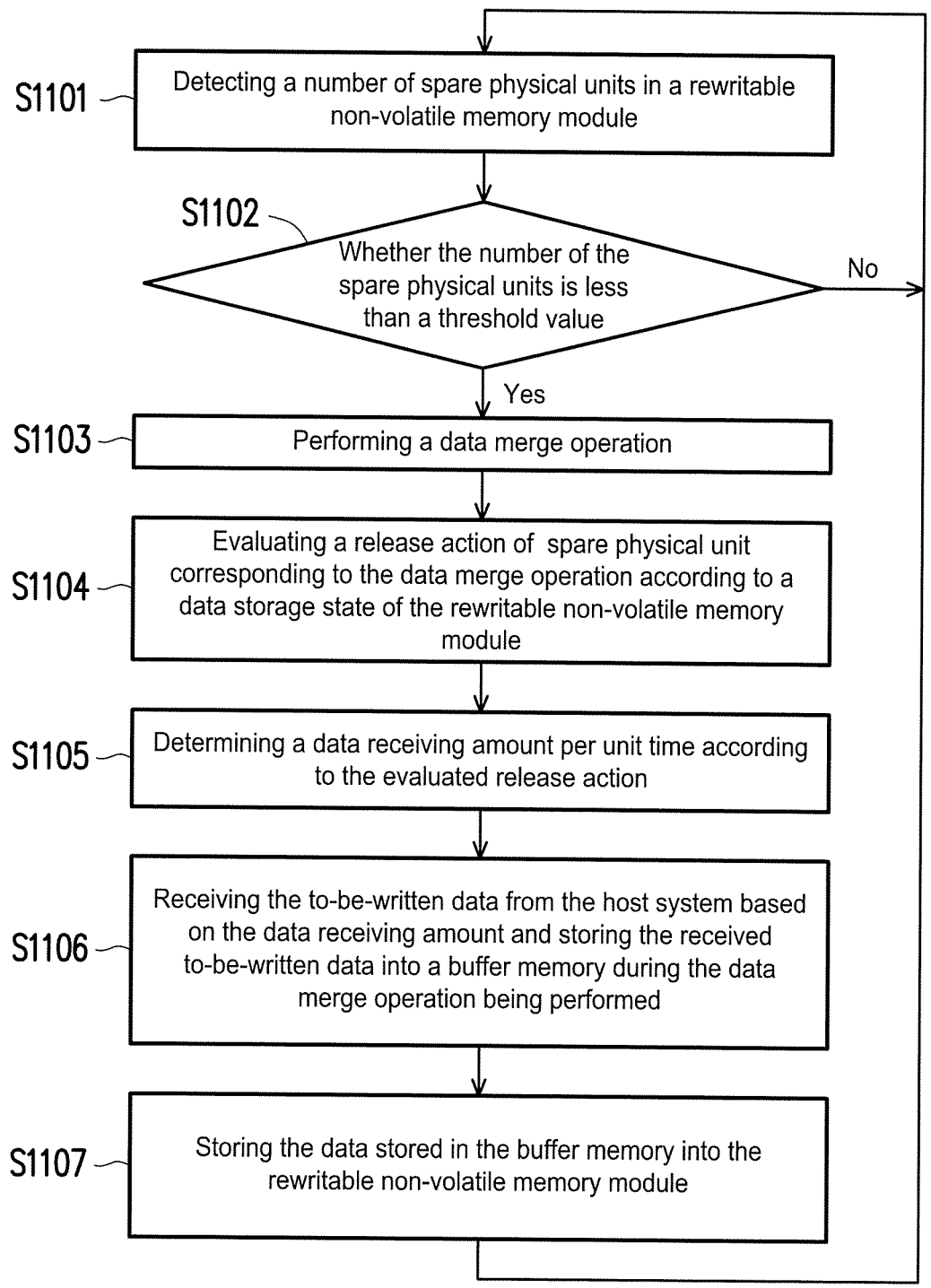
FIG. 11 is a flowchart illustrating a data storage method according to another exemplary embodiment of the disclosure.

FIG. 11 is a flowchart illustrating a data storage method according to another exemplary embodiment of the disclosure.

Referring to FIG. 11, in step S1101, the number of spare PUs in a RNVM module is detected. In step S1102, the number of the spare PUs is deter mined whether to be less than a threshold value. If it is determined that the number of the spare PUs is less than the threshold value, a data merge operation is performed in step S1103. If the number of the spare PUs is not less than the threshold value, step S1101 may be returned to. In step S1104, a release action of spare PU corresponding to the data merge operation is evaluated according to a data storage state of the RNVM module. In step S1105, a data receiving amount per unit time is determined according to the evaluated release action of spare PU. In step S1106, during the data merge operation being performed, the to-be-written data is received from the host system based on the data receiving amount per unit time and the received to-be-written data is stored into a buffer memory. In step S1107, the data stored in the buffer memory is stored into the RNVM module. In addition, step S1101 may be returned to after performing step S1107. Note that the disclosure does not intend to limit the order of step S1103, step S1104, and step S1105 to be performed. For example, in another exemplary embodiment, step S1104 and step S1105 may be performed before step S1103 is performed, or step S1103, S1104, and step S1105 may be performed simultaneously.

Nevertheless, each step of FIG. 10 and FIG. 11 has been specified as above and thus is not repeated hereinafter. It should be noted that each step of FIG. 10 and FIG. 11 may be implemented as a plurality of program codes or circuits. The disclosure is not limited thereto. In addition, the method of FIG. 10 and FIG. 11 may be used in combination with the above-described exemplary embodiments or be used solely. The disclosure is not limited thereto.

In view of the foregoing, the data storage state of the RNVM module may be used for determine the data receiving amount per unit time for receiving the data from the host system. After beginning to perform the data merge operation of the RNVM module, the data received from the host system based on the data receiving amount per unit time is stored into the buffer memory and then stored into the RNVM module. As such, during the period in which the host system continues to store data into the memory storage device, even though the memory storage device is currently performing the data merge operation, the data writing speed of the memory storage device relative to the host system may be maintained to be steady. In addition, through adjusting the to-be-written data transmission parameter for receiving the data from the host system, the data merge operation is not influenced, and that the performance efficiency of the data merge operation is prevented from being lowered.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data storage method configured for a rewritable non-volatile memory module, wherein the rewritable non-volatile memory module comprises a plurality of physical units, and the data storage method comprises:
    performing a data merge operation;
    obtaining information which reflects a distribution state of valid data stored in at least one physical unit among the physical units;
    obtaining a physical unit release rate of the data merge operation according to the information which reflects the distribution state of the valid data stored in the at least one physical unit, wherein the physical unit release rate reflects that one spare physical unit can be released each time N physical units are fully written by valid data collected by the data merge operation, wherein N is a positive integer;
    determining a data receiving amount per unit time for receiving to-be-written data from a host system according to the physical unit release rate, wherein the step of determining the data receiving amount per unit time for receiving the to-be-written data from the host system according to the physical unit release rate comprises:
        adjusting a to-be-written data transmission parameter, wherein the to-be-written data transmission parameter reflects the data receiving amount per unit time,
    wherein the to-be-written data transmission parameter comprises an event execution time parameter, an event state reply time parameter, or a frequency limitation parameter;
    storing the to-be-written data into a buffer memory during the data merge operation being performed; and
    storing the to-be-written data stored in the buffer memory into the rewritable non-volatile memory module.

2. The data storage method as claimed in claim 1, wherein the step of determining the data receiving amount per unit time for receiving the to-be-written data from the host system according to the information which reflects the distribution state of the valid data stored in the at least one physical unit comprises:
    evaluating a release action of a spare physical unit corresponding to the data merge operation; and
    determining the data receiving amount per unit time according to the evaluated release action.

3. The data storage method as claimed in claim 2, wherein the step of evaluating the release action of the spare physical unit corresponding to the data merge operation comprises:
    obtaining a valid count of a non-spare physical unit among the physical units, wherein the valid count corresponds to a data amount of valid data stored in the non-spare physical unit; and
    evaluating the release action according to the valid count.

4. The data storage method as claimed in claim 2, wherein the step of determining the data receiving amount per unit time according to the evaluated release action of the spare physical unit comprises:
    determining the data receiving amount per unit time according to a data writing speed of the data merge operation and the evaluated release action.

5. The data storage method as claimed in claim 2, wherein the determined data receiving amount per unit time is positively related to a release rate of the spare physical unit corresponding to the evaluated release action.

6. The data storage method as claimed in claim 1, further comprising:
    maintaining a data receiving speed for receiving the to-be-written data from the host system to be identical to a determined data receiving amount per unit time.

7. The data storage method as claimed in claim 6, wherein the step of maintaining the data receiving speed for receiving the to-be-written data from the host system to be identical to the determined data receiving amount per unit time comprises:
  increasing the data receiving speed to be equal to the determined data receiving amount per unit time if a current data receiving speed for receiving the to-be-written data from the host system is less than the determined data receiving amount per unit time; and
  decreasing the data receiving speed to be equal to the determined data receiving amount per unit time if the current data receiving speed is greater than the determined data receiving amount per unit time.

8. The data storage method as claimed in claim 1, further comprising:
  not limiting a data writing speed of the data merge operation.

9. The data storage method as claimed in claim 1,
  wherein the to-be-written data transmission parameter further comprises a bandwidth limitation parameter.

10. The data storage method as claimed in claim 1, wherein the data receiving amount per unit time for receiving the to-be-written data from the host system during a period of performing the data merge operation is lower than a data receiving amount per unit time for receiving another to-be-written data from the host system during a period of not performing the data merge operation.

11. The data storage method as claimed in claim 1, wherein the determined data receiving amount per unit time is negatively related to a time required for execution of a release action of a spare physical unit corresponding to the data merge operation.

12. A memory storage device, comprising:
  a connection interface unit configured to be coupled to a host system;
  a rewritable non-volatile memory module, wherein the rewritable non-volatile memory module comprises a plurality of physical units; and
  a memory control circuit unit coupled to the connection interface unit and the rewritable non-volatile memory module,
  wherein the memory control circuit unit is configured to instruct the rewritable non-volatile memory module to perform a data merge operation,
  wherein the memory control circuit unit is further configured to obtain information which reflects a distribution state of valid data stored in at least one physical unit among the physical units,
  wherein the memory control circuit unit is further configured to obtain a physical unit release rate of the data merge operation according to the information which reflects the distribution state of the valid data stored in the at least one physical unit, wherein the physical unit release rate reflects that one spare physical unit can be released each time N physical units are fully written by valid data collected by the data merge operation, wherein N is a positive integer,
  wherein the memory control circuit unit is further configured to determine a data receiving amount per unit time for receiving to-be-written data from the host system according to the physical unit release rate,
  wherein the operation of determining the data receiving amount per unit time for receiving the to-be-written data from the host system according to the physical unit release rate comprises:
    adjusting a to-be-written data transmission parameter, wherein the to-be-written data transmission parameter reflects the data receiving amount per unit time,
  wherein the to-be-written data transmission parameter comprises an event execution time parameter, an event state reply time parameter, or a frequency limitation parameter,
  wherein the memory control circuit unit is further configured to store the to-be-written data into a buffer memory during the data merge operation being performed,
  wherein the memory control circuit unit is further configured to instruct to store the to-be-written data stored in the buffer memory into the rewritable non-volatile memory module.

13. The memory storage device as claimed in claim 12, wherein the operation of determining the data receiving amount per unit time for receiving the to-be-written data from the host system according to the information which reflects the distribution state of the valid data stored in the at least one physical unit comprises:
  evaluating a release action of a spare physical unit corresponding to the data merge operation; and
  determining the data receiving amount per unit time according to the evaluated release action.

14. The memory storage device as claimed in claim 13, wherein the operation of the memory control circuit unit to evaluate the release action of the spare physical unit corresponding to the data merge operation comprises:
  obtaining a valid count of a non-spare physical unit among the physical units, wherein the valid count corresponds to a data amount of valid data stored in the non-spare physical unit; and
  evaluating the release action according to the valid count.

15. The memory storage device as claimed in claim 13, wherein the operation of the memory control circuit unit to determine the data receiving amount per unit time according to the evaluated release action comprises:
  determining the data receiving amount per unit time according to a data writing speed of the data merge operation and the evaluated release action.

16. The memory storage device as claimed in claim 13, wherein the determined data receiving amount per unit time is positively related to a release rate of the spare physical unit corresponding to the evaluated release action.

17. The memory storage device as claimed in claim 12, wherein the memory control circuit unit is further configured to maintain a data receiving speed for receiving the to-be-written data from the host system to be identical to a determined data receiving amount per unit time.

18. The memory storage device as claimed in claim 17, wherein the operation of the memory control circuit unit to maintain the data receiving speed for receiving the to-be-written data from the host system to be identical to the determined data receiving amount per unit time comprises:
  increasing the data receiving speed to be equal to the determined data receiving amount per unit time if a current data receiving speed for receiving the to-be-written data from the host system is less than the determined data receiving amount per unit time; and
  decreasing the data receiving speed to be equal to the determined data receiving amount per unit time if the current data receiving speed is greater than the determined data receiving amount per unit time.

19. The memory storage device as claimed in claim 12, wherein the memory control circuit unit is further configured not to limit a data writing speed of the data merge operation.

20. The memory storage device as claimed in claim 12, wherein the to-be-written data transmission parameter further comprises a bandwidth limitation parameter.

21. The memory storage device as claimed in claim 12, wherein the data receiving amount per unit time for receiving the to-be-written data from the host system during a period of performing the data merge operation is lower than a data receiving amount per unit time for receiving another to-be-written data from the host system during a period of not performing the data merge operation.

22. The memory storage device as claimed in claim 12, wherein the determined data receiving amount per unit time is negatively related to a time required for execution of a release action of a spare physical unit corresponding to the data merge operation.

23. A memory control circuit unit configured to control a rewritable non-volatile memory module, wherein the rewritable non-volatile memory module comprises a plurality of physical units, wherein the memory control circuit unit comprises;
a host interface configured to be coupled to a host system;
a memory interface configured to be coupled to the rewritable non-volatile memory module;
a buffer memory; and
a memory management circuit coupled to the host interface, the memory interface, and the buffer memory,
wherein the memory management circuit is configured to instruct the rewritable non-volatile memory module to perform a data merge operation,
wherein the memory management circuit is further configured to obtain information which reflects a distribution state of valid data stored in at least one physical unit among the physical units,
wherein the memory management circuit is further configured to obtain a physical unit release rate of the data merge operation according to the information which reflects the distribution state of the valid data stored in the at least one physical unit, wherein the physical unit release rate reflects that one spare physical unit can be released each time N physical units are fully written by valid data collected by the data merge operation, wherein N is a positive integer,
wherein the memory management circuit is further configured to determine a data receiving amount per unit time for receiving to-be-written data from the host system according to the physical unit release rate,
wherein the operation of determining the data receiving amount per unit time for receiving the to-be-written data from the host system according to the physical unit release rate comprises:
adjusting a to-be-written data transmission parameter, wherein the to-be-written data transmission parameter reflects the data receiving amount per unit time,
wherein the to-be-written data transmission parameter comprises an event execution time parameter, an event state reply time parameter, or a frequency limitation parameter,
wherein the memory management circuit is further configured to store the to-be-written data into the buffer memory during the data merge operation being performed,
wherein the memory management circuit is further configured to instruct to store the to-be-written data stored in the buffer memory into the rewritable non-volatile memory module.

24. The memory control circuit unit as claimed in claim 23, wherein the operation of determining the data receiving amount per unit time for receiving the to-be-written data from the host system according to the information which reflects the distribution state of the valid data stored in the at least one physical unit comprises:
evaluating a release action of a spare physical unit corresponding to the data merge operation; and
determining the data receiving amount per unit time according to the evaluated release action.

25. The memory control circuit unit as claimed in claim 24, wherein the operation of the memory management circuit to evaluate the release action of the spare physical unit corresponding to the data merge operation comprises:
obtaining a valid count of a non-spare physical unit among the physical units, wherein the valid count corresponds to a data amount of valid data stored in the non-spare physical unit; and
evaluating the release action according to the valid count.

26. The memory control circuit unit as claimed in claim 24, wherein the operation of the memory management circuit to determine the data receiving amount per unit time according to the evaluated release action comprises:
determining the data receiving amount per unit time according to a data writing speed of the data merge operation and the evaluated release action.

27. The memory control circuit unit as claimed in claim 24, wherein the determined data receiving amount per unit time is positively related to a release rate of the spare physical unit corresponding to the evaluated release action.

28. The memory control circuit unit as claimed in claim 23, wherein the memory management circuit is further configured to maintain a data receiving speed for receiving the to-be-written data from the host system to be identical to a determined data receiving amount per unit time.

29. The memory control circuit unit as claimed in claim 28, wherein the operation of the memory management circuit to maintain the data receiving speed for receiving the to-be-written data from the host system to be identical to the determined data receiving amount per unit time comprises:
increasing the data receiving speed to be equal to the determined data receiving amount per unit time if a current data receiving speed for receiving the to-be-written data from the host system is less than the determined data receiving amount per unit time; and
decreasing the data receiving speed to be equal to the determined data receiving amount per unit time if the current data receiving speed is greater than the determined data receiving amount per unit time.

30. The memory control circuit unit as claimed in claim 23, wherein the memory management circuit is further configured not to limit a data writing speed of the data merge operation.

31. The memory control circuit unit as claimed in claim 23,
wherein the to-be-written data transmission parameter further comprises a bandwidth limitation parameter.

32. The memory control circuit unit as claimed in claim 23, wherein the data receiving amount per unit time for receiving the to-be-written data from the host system during a period of performing the data merge operation is lower than a data receiving amount per unit time for receiving another to-be-written data from the host system during a period of not performing the data merge operation.

33. The memory control circuit unit as claimed in claim 23, wherein the determined data receiving amount per unit time is negatively related to a time required for execution of a release action of a spare physical unit corresponding to the data merge operation.

* * * * *